(12) United States Patent
Zemek et al.

(10) Patent No.: US 10,939,259 B2
(45) Date of Patent: Mar. 2, 2021

(54) METHOD FOR CONTROLLING THE SHARING OF AT LEAST ONE ELECTRONIC CONTENT BETWEEN A FIRST USER EQUIPMENT AND AT LEAST A SECOND USER EQUIPMENT

(71) Applicant: Orange, Paris (FR)

(72) Inventors: Radim Zemek, Tokyo (JP); Asako Nakano, Copenhagen (DK)

(73) Assignee: ORANGE, Paris (FR)

( * ) Notice: Subject to any disclaimer, the term of this patent is extended or adjusted under 35 U.S.C. 154(b) by 249 days.

(21) Appl. No.: 15/539,496

(22) PCT Filed: Dec. 18, 2015

(86) PCT No.: PCT/IB2015/002552
§ 371 (c)(1),
(2) Date: Jun. 23, 2017

(87) PCT Pub. No.: WO2016/103039
PCT Pub. Date: Jun. 30, 2016

(65) Prior Publication Data
US 2017/0353419 A1    Dec. 7, 2017

(30) Foreign Application Priority Data

Dec. 23, 2014    (EP) .................................... 14307177

(51) Int. Cl.
| | |
|---|---|
| *H04W 4/21* | (2018.01) |
| *G06Q 10/10* | (2012.01) |
| *H04L 12/58* | (2006.01) |
| *H04L 29/06* | (2006.01) |
| *H04L 29/08* | (2006.01) |

(52) U.S. Cl.
CPC .............. *H04W 4/21* (2018.02); *G06Q 10/10* (2013.01); *H04L 51/046* (2013.01); *H04L 51/18* (2013.01);

(Continued)

(58) Field of Classification Search
None
See application file for complete search history.

(56) References Cited

U.S. PATENT DOCUMENTS

2007/0271338 A1    11/2007    Anschutz
2011/0252118 A1*   10/2011    Pantos .................. G06F 3/0484
                                                         709/219

(Continued)

FOREIGN PATENT DOCUMENTS

WO    2004049182 A1    6/2004

OTHER PUBLICATIONS

International Search Report dated Mar. 1, 2016 for corresponding International Application No. PCT/IB2015/002552, filed Dec. 18, 2015.

(Continued)

*Primary Examiner* — Jeffrey R Swearingen
(74) *Attorney, Agent, or Firm* — David D. Brush; Westman, Champlin & Koehler, P.A.

(57) ABSTRACT

A method sharing at least one electronic content between first and second user equipment. A server stores the contents enabling transmission of the content to the first user equipment. The method includes the server: receiving, from the first user equipment, a request for sharing the transmitted electronic content; generating a sharing parameter from an identifier of the first user equipment and an identifier of the transmitted electronic content; establishing a second communication session with the second user equipment associated with the sharing parameter; determining, based on the sharing parameter, that the user equipment requesting a sharing of content is the first user equipment and the content to be shared is the transmitted content; and if the transmitted content is being played on the first user equipment, transmitting the transmitted content to the second user equipment (Continued)

in order for the transmitted content to be played simultaneously on the second user equipment.

11 Claims, 4 Drawing Sheets

(52) U.S. Cl.
CPC ...... *H04L 65/4076* (2013.01); *H04L 65/4084* (2013.01); *H04L 67/146* (2013.01); *H04L 67/1095* (2013.01)

(56) References Cited

U.S. PATENT DOCUMENTS

| | | | |
|---|---|---|---|
| 2013/0219072 A1* | 8/2013 | Han | H04L 65/60 709/228 |
| 2014/0149859 A1* | 5/2014 | Van Dyken | H04W 4/21 715/702 |
| 2014/0181202 A1* | 6/2014 | Gossain | H04L 67/325 709/204 |
| 2015/0058450 A1* | 2/2015 | Hahm | H04L 65/4084 709/219 |
| 2016/0165558 A1* | 6/2016 | Kafle | H04L 65/4069 370/350 |

OTHER PUBLICATIONS

Written Opinion of the International Searching Authority dated Mar. 1, 2016 for corresponding International Application No. PCT/IB2015/002552, filed Dec. 18, 2015.

* cited by examiner

METHOD FOR CONTROLLING THE SHARING OF AT LEAST ONE ELECTRONIC CONTENT BETWEEN A FIRST USER EQUIPMENT AND AT LEAST A SECOND USER EQUIPMENT

This Application is a Section 371 National Stage Application of International Application No. PCT/IB2015/002552, filed Dec. 18, 2015, which is incorporated by reference in its entirety and published as WO 2016/103039 A1 on Jun. 30, 2016, in English.

The present invention generally relates to the sharing of electronic contents between devices.

Electronic content sharing has become quite common in the recent years with the democratization of the Internet and the developing of smart devices, such as smartphones, tablets, laptop, etc.

Many websites enable the sharing of electronic contents such as Dailymotion© which enables the sharing of video and audio contents, Flickr© which enables the sharing of pictures, etc.

The developing of social networks such as Facebook©, Twitter©, etc. facilitates the sharing of electronic contents between users.

When a user wants to share an electronic content with one or more of his contacts, such as a video content accessible via Dailymotion for example, he may copy an URL (Uniform Resource Locator) pointing toward the electronic content he wants to share and then paste it in an email or in an instant message intended to the selected contacts.

Another way to share an electronic content accessible via websites enabling the sharing of electronic contents, is for the user to select a share button associated to the electronic content to be shared by means of a graphical user interface, also called GUI (Graphical User Interface) such as a mouse and a screen or a touchscreen, this share button allows the sharing of the electronic content on a social network. A link, such as an URL, pointing toward the electronic content the user wants to share is displayed on the timeline of the profile of the user on the social network. Thus, all the contacts of the user on the social network can access the electronic content.

Other solutions enabling the sharing of electronic contents stored on a user device exist. One example of such a solution is AirDrop© which is an application for sharing electronic contents such as webpages, pictures, video contents, audio contents, etc. developed by Apple® for their own devices. The user of a smart device selects an electronic content stored on the smart device and then launches the sharing application. Through a dedicated GUI, the user selects the contacts with whom he wants to share the selected electronic content. A pop-up window is displayed on the screen of the user device of the selected contact prompting him to accept or to refuse the sharing of the electronic content.

Whatever method is used by the user to share an electronic content, the contact with whom the user shared the electronic content accesses the electronic content on his device independently of the user who shared it. That is to say, even if the user and the contact share an electronic content that does not mean they access the shared electronic content at the same time, there is a temporal gap between the moment the user access the electronic content and the moment the contact access the electronic content.

This temporal gap maybe an issue when the shared electronic content is a working document such as a lecture or a report or when the user and the contact are next to each other but accessing the same electronic content each on their own devices. This may reduce the quality of experience of both the user and the contact.

It is an objective of the present invention to overcome disadvantages and/or make improvements in the prior art.

In that respect, the present invention relates to a method for controlling the sharing of at least one electronic content between a first user equipment and at least a second user equipment, a first communication session being established between the first user equipment and a server storing electronic contents enabling the transmission of at least one electronic content to the first user equipment, wherein the server:

receives, from the first user equipment, a request for sharing the transmitted electronic content, transmits a sharing parameter generated by the server from an identifier of the first user equipment and an identifier of the transmitted electronic content to the first user equipment receives a request, emitted by a second user equipment, for establishing a second communication session, said request for establishing a second communication session comprising the sharing parameter, determines, based on the received sharing parameter, that the user equipment requesting a sharing of an electronic content is the first user equipment and the electronic content to be shared is the transmitted electronic content, if the transmitted electronic content is being played on the first user equipment, transmits said transmitted electronic content to the second user equipment in order for said transmitted electronic content to be played simultaneously on the second user equipment.

Such a method enables the simultaneous sharing of an electronic content between a plurality of users.

By simultaneous it to be understood that at a given instant t the shared electronic content is played on the first and the second user equipment.

The sharing parameter received by the server in the request for establishing the second communication session enables the server to identify the electronic content to be shared and to determine, based on the knowledge of the identifier of the first user equipment, if the shared electronic content is being played on the first user equipment.

If the shared electronic content is being played on the first user equipment, then the playing of the electronic content is triggered on the second user equipment.

Thus, the users of the first and second user equipments can access simultaneously the shared electronic content enhancing the quality of experience of the users.

According to a feature of the method controlling the sharing of at least one electronic content between a first user equipment and a second user equipment, the server transmits the transmitted electronic content to the second user equipment in order for the transmitted electronic content to be played synchronously on the first user equipment and on the second user equipment.

If the server determines that the shared electronic content is being played on the first user equipment, then the server transmits the shared electronic content to the second user equipment and triggers the playing of the shared electronic content on the second user equipment at the same instant of the electronic content.

For example, a trailer of a movie is played on the first user equipment. This trailer lasts 3:50 minutes. When the second communication is established between the second user equipment and the server, 1:30 minutes of the trailer has already played on the first user equipment. The server triggers the playing of the trailer on the second user equipment starting at 1:30 minutes from the beginning of the trailer.

Thus the users of the first user equipment and of the second user equipment can watch the same thing at the same time as if they were sharing the same screen.

According to a feature of the method controlling the sharing of at least one electronic content between a first user equipment and a second user equipment, when a duration of the transmitted electronic content already played on the first user equipment exceeds a threshold, the server transmits the transmitted electronic content to the second user equipment in order for the transmitted electronic content to be played on the second user equipment from the beginning of said transmitted electronic content.

Back to the trailer of the movie played on the first user equipment; if, when the second communication is established between the second user equipment and the server, 80%, i.e. 3:06 minutes out of the 3:50 minutes representing the duration of the trailer, of the trailer of the movie has already played, the server triggers the playing of the trailer on the second user equipment from the beginning of the trailer.

Thus, the user of the second user equipment may access to a significant portion of the electronic content.

According to a feature of the method controlling the sharing of at least one electronic content between a first user equipment and a second user equipment, if the playing of the transmitted electronic content on the first user equipment is over, the server transmits said transmitted electronic content to the second user equipment in order for said transmitted electronic content to be played on the second user equipment.

Even if the shared electronic content is no longer played on the first user equipment, the user of the second user equipment can access the shared content.

The invention also concerns a method for sharing at least one electronic content between a first user equipment and at least a second user equipment, a first communication session being established between the first user equipment and a server storing electronic contents enabling the transmission of at least one electronic content to the first user equipment, wherein the first user equipment:

Transmits, to the server, a request for sharing the transmitted electronic content, Receives, from the server, a sharing parameter generated by the server from an identifier of the first user equipment and an identifier of the transmitted electronic content, Transmits, to the second user equipment, a message comprising the sharing parameter.

Another object of the invention is method for accessing at least an electronic content stored on a server, a first communication session being established between a first user equipment and the server enabling the transmission of the electronic content to be accessed to the first user equipment, wherein a second user equipment:

Receives, from the first user equipment, a sharing parameter generated by the server from an identifier of the first user equipment and an identifier of the electronic content to be accessed, Transmits a request, to the server, for establishing a second communication session, said request for establishing a second communication session comprising the sharing parameter, Receives, from the server, said electronic content to be accessed in order for said transmitted electronic content to be played on the second user equipment.

An object of the invention is a server capable of controlling the sharing of at least one electronic content between a first user equipment and at least a second user equipment, a first communication session being established between the first user equipment and the server, comprising storing electronic contents, enabling the transmission of at least one electronic content to the first user equipment, wherein the server comprises:

A receiver for receiving, from the first user equipment, a request for sharing the transmitted electronic content, A transmitter for transmitting a sharing parameter generated by the server from an identifier of the first user equipment and an identifier of the transmitted electronic content to the first user equipment A receiver for receiving a request, emitted by a second user equipment, for establishing a second communication session, said request for establishing a second communication session comprising the sharing parameter, Means for determining, based on the received sharing parameter, that the user equipment requesting a sharing of an electronic content is the first user equipment and the electronic content to be shared is the transmitted electronic content, Means for determining if the transmitted electronic content is being played on the first user equipment, A transmitter for transmitting, when the transmitted electronic content is being played on the first user equipment, said transmitted electronic content to the second user equipment in order for said transmitted electronic content to be played simultaneously on the second user equipment.

Another object of the invention is a user equipment capable of sharing at least one electronic content with at least another user equipment, a first communication session being established between the user equipment and a server storing electronic contents enabling the transmission of at least one electronic content to the user equipment, wherein the user equipment:

A transmitter for transmitting, to the server, a request for sharing the transmitted electronic content, A receiver for receiving, from the server, a sharing parameter generated by the server from an identifier of the first user equipment and an identifier of the transmitted electronic content, A transmitter for transmitting, to the other user equipment, a message comprising the sharing parameter.

Such a user equipment may be a smart device, a tablet, a laptop, a personal computer, etc.

Another object of the invention is a user equipment capable of accessing at least an electronic content stored on a server, a first communication session being established between another user equipment and the server enabling the transmission of the electronic content to be accessed to the other user equipment, wherein a second user equipment:

A receiver for receiving, from the other user equipment, a sharing parameter generated by the server from an identifier of the other user equipment and an identifier of the electronic content to be accessed, A transmitter for transmitting a request, to the server, for establishing a second communication session, said request for establishing a second communication session comprising the sharing parameter, A receiver for receiving, from the server, said electronic content to be accessed in order for said transmitted electronic content to be played on the second user equipment.

Such a user equipment may be a smart device, a tablet, a laptop, a personal computer, etc.

Finally, one object of the invention concerns computer programs, in particular computer programs on or in an information medium or memory, suitable for implementing the methods object of the invention. These programs can use any programming language, and be in the form of source code, binary code, or of code intermediate between source code and object code such as in a partially compiled form, or in any other desirable form for implementing the communication methods according to the invention.

The information medium may be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The programs according to the invention may in particular be downloaded from a network of Internet type.

The present invention is explained in further detail, and by way of example, with reference to the accompanying drawings wherein.

Figure 1:
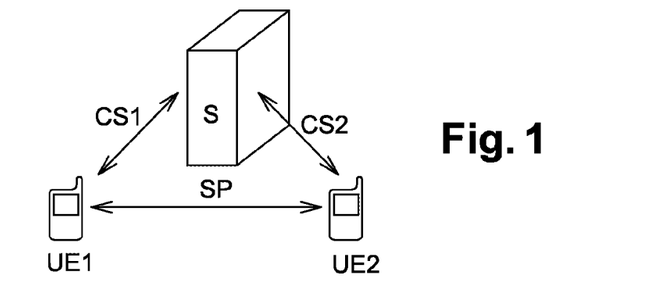
FIG. 1 represents a system in which the methods according to the invention are executed.

The system represented on FIG. 1 comprises a first user equipment UE1, at least a second user equipment UE2 and a server S.

A first communication session CS1 is established between the first user equipment UE1 and the server S. During this communication session CS1, a user of the first user equipment UE1 can access a plurality of electronic contents stored on the server S. these electronic contents may be accessible via sharing platforms such as Dailymotion, Spotify, etc. or may be stored in a memory of the server dedicated to the user of the first user equipment UE1.

While the communication session CS1 is still established between the first user equipment UE1 and the server S, the user of the first user equipment UE1 decides to share an electronic content stored on the server S with another user. Using a dedicated GUI on the first user equipment UE1, the user selects one or more electronic contents to share. The user equipment UE1 informs the server S of the selected electronic contents by sending a request for sharing electronic contents to the server S.

The server S generates a sharing parameter SP based on an identifier of the electronic content to be shared and on an identifier of the first user equipment UE1. The identifier of the first user equipment UE1 may be retrieved while establishing the first communication session CS1 between the first user equipment UE1 and the server S.

The sharing parameter SP is then transmitted by the server S to the first user equipment UE1.

Upon reception of the sharing parameter SP, the user of the first user equipment UE1 then selects one or more contacts with whom he wishes to share the selected electronic content using a dedicated GUI such as the GUI of AirDrop.

Then, the first user equipment UE1 sends a message to the second user equipment UE2 belonging to one of the selected contacts comprising the sharing parameter SP, and information for contacting the server S.

Upon reception of this message, the second user equipment UE2 sends a request to the server S requesting the establishment of a second communication session CS2 during which the selected electronic contents will be transmitted to the second user equipment UE2. The request from the second user equipment comprises the sharing parameter SP.

The server S checks whether the selected electronic content is being played on the first user equipment UE1, then the playing of the electronic content is triggered on the second user equipment UE2.

Thus, the users of the first and second user equipment can access simultaneously the shared electronic content enhancing the quality of experience of the users.

Figure 2:
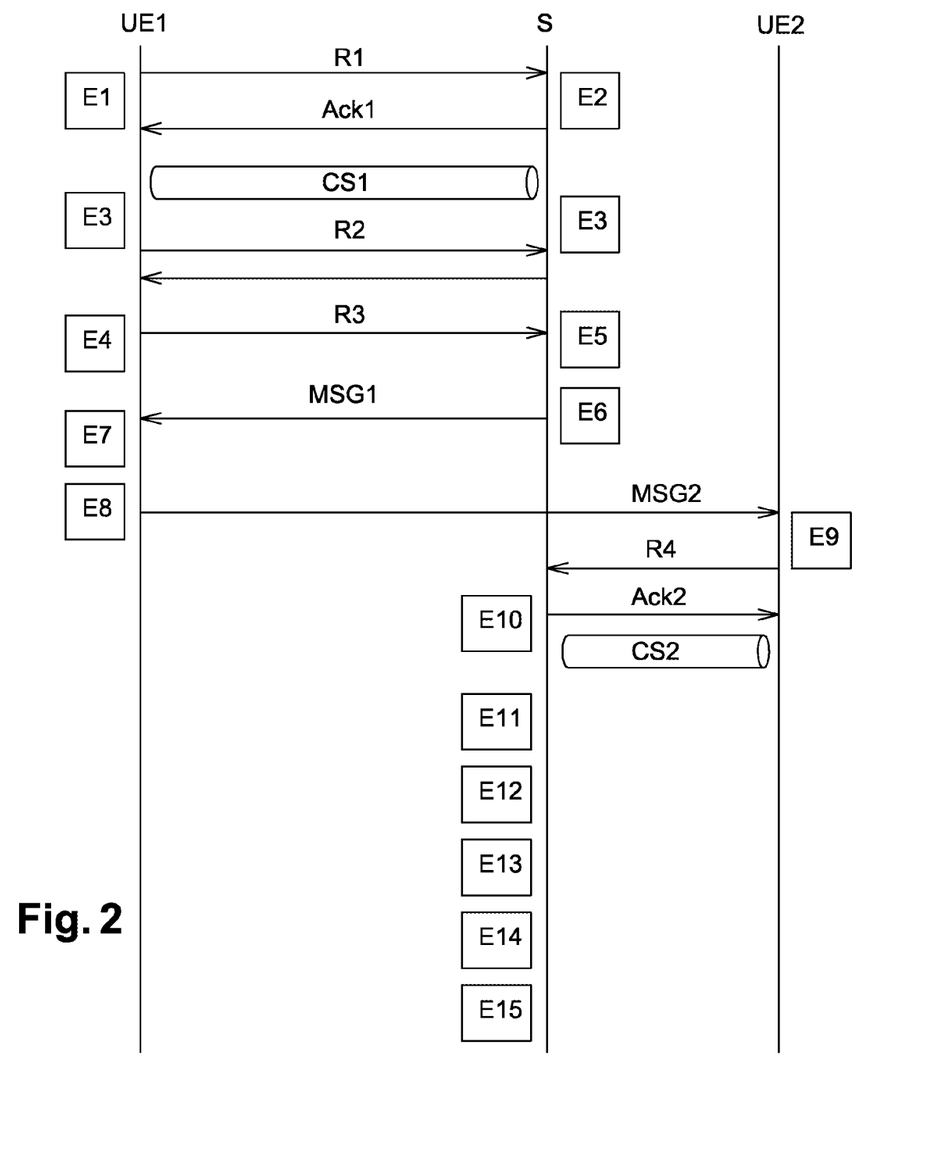
FIG. 2 represents a flowchart of the different steps of the method for sharing an electronic content between a plurality of user equipments.

FIG. 2 represents a flowchart of the different steps of the method for sharing an electronic content between a plurality of user equipments.

In a step E1, the first user equipment UE1 sends a request R1 for establishing a communication session CS1 with the server S. This request R1 comprises an identifier Id1 of the first user equipment UE1. In a step E2, the server S answers to the request R1 by sending a message of acknowledgement Ack1 to the first user equipment UE1. Upon reception of the message of acknowledgment Ack1 by the user equipment UE1, the communication session CS1 is established.

In a step E3, the first user equipment UE1 sends a request R2 to the server S for accessing an electronic content stored on the server S. The electronic content may be accessible from a website or may belong to the user of the user equipment UE1 such as personal video content, music playlists, etc.

In answer to the request R2 for accessing an electronic content, the server S triggers the transmission of the electronic content to the user equipment UE1 in a step E3.

The electronic content is either downloaded or streamed on the first user equipment UE1.

During a step E4, which may be or may be not concomitant with step E3, the user equipment UE1 sends a request R3 for sharing at least one electronic content to the server S. The request R3 comprises an identifier Id2 of the electronic content to be shared and other information such as an authorization to play synchronously the selected electronic content on both user equipments UE1 and UE2, the possibility for the second user equipment UE2 to refuse the synchronization of the playing of the selected electronic content, etc. In an embodiment of the method of the invention, the servers S already knows the identifier Id2 of the selected electronic content, so the request R3 does not comprise said identifier Id2.

In a step E5, the server S generate a sharing parameter SP based on the identifier Id1 of the first user equipment UE1 and the identifier Id2 of the electronic content to be shared.

The sharing parameter SP is issued for a certain length of time. For example, the sharing parameter SP is valid only as long as the shared electronic content is being played on the first user equipment UE1.

In another example, the selected electronic content can be accessed by a user equipment other than the first user equipment UE1 only a certain number of time, for example five times, before the sharing parameter SP is no longer valid.

In a step E6, the server S sends a message MSG1 to the first user equipment UE1 comprising the sharing parameter SP.

In an embodiment of the method according to the invention, instead of a field in the message MSG1 comprising the sharing parameter SP, the server S sends a message MSG1 comprising an URL to the first user equipment UE1. The URL may be of the form www.orangebubble.com/sharing-parameter.

In a step E7, the user equipment UE1 receives the message MSG1. In a step E8 the user equipment UE1 sends a message MSG2 to a second user equipment UE2 belonging to one of the contacts with whom the user of the first user equipment UE1 wishes to share the selected electronic content. The message MSG2 comprises the sharing parameter SP and a piece of information enabling the second user equipment UE2 to communicate with the server S.

In a step E9, the second user equipment UE2 sends a request R4 to the server S for establishing a second communication session CS2 between the second user equipment UE2 and the server S. The request R4 comprises the sharing parameter SP.

In a step E10, the server S answers to the request R4 by sending a message of acknowledgement Ack2 to the second user equipment UE2. Upon reception of the message of acknowledgment Ack2 by the user equipment UE2, the communication session CS2 is established.

In a step E11, the server S verifies if the sharing parameter SP is still valid. When the validity of the sharing parameter depends on the number of times the selected electronic content referred to in the sharing parameter SP can be accessed, the server S checks how many time the selected electronic content effectively was accessed.

In a step E12, the server S then checks whether the selected electronic content is currently played on the first user equipment UE1. In the embodiment where the sharing parameter SP is issued for a certain length of time, for example, as long as the shared electronic content is being played on the first user equipment UE1, steps E11 and E12 are one and the same.

In a step E13, if the sharing parameter SP is valid and the selected electronic content is currently played on the first user equipment UE1, the server S transmits the selected electronic content to the second user equipment UE2 and triggers, in a step E14, the playing of the selected electronic content on the second user equipment UE2. Thus, the selected electronic content is played at the same time on the first user equipment UE1 and on the second user equipment UE2.

In another embodiment of the method according to the invention, the server S triggers, during the step E14, the playing of the selected electronic content on the second user equipment UE2 in order for the selected electronic content to be played synchronously on the first user equipment UE1 and on the second user equipment UE2.

For example, a trailer of a movie is played on the first user equipment UE1. This trailer lasts 3:50 minutes. When the second communication session CS2 is established between the second user equipment UE2 and the server S, 1:30 minutes of the trailer has already played on the first user equipment UE1. The server S triggers the playing of the trailer on the second user equipment UE2 starting at 1:30 minutes from the beginning of the trailer. In this embodiment, it is interesting that the two contents are played in synch on the first and second user equipment UE1 and UE2. Indeed, the sharing may be subsequent to the two users viewing the content on UE1. The synchronization allows the second user to enjoy viewing the content even after leaving the first user. To do so, the server may check a timestamp describing which part of the content is currently played on UE1 and transmit the content for rendering on the second user equipment UE2 from that timestamp. The timestamp may be corrected by a time estimate of the transmission delays to the second user equipment UE2.

Thus the users of the first user equipment UE1 and of the second user equipment UE2 can watch the same event at the same time as if they were sharing the same screen and watching the trailer on this unique screen.

During step E14, the server S determines if a duration of the transmitted electronic content already played on the first user equipment UE1 exceeds a threshold T. The threshold T may be for example 80%, i.e. the server S determines if 80% of the selected electronic content is already played on the first user equipment UE1. If it is the case, then the server S triggers the playing of the selected electronic content on the second user equipment UE2 from the beginning of said transmitted electronic content.

In the embodiment where the sharing parameter SP is issued for a certain length of time, for example, as long as the shared electronic content is being played on the first user equipment UE1, if the server S determines during step E12 that the selected electronic content is no longer played on the first user equipment UE1, the server S nevertheless transmits the select electronic content to the second user equipment UE2 during a step E15.

Figure 3:
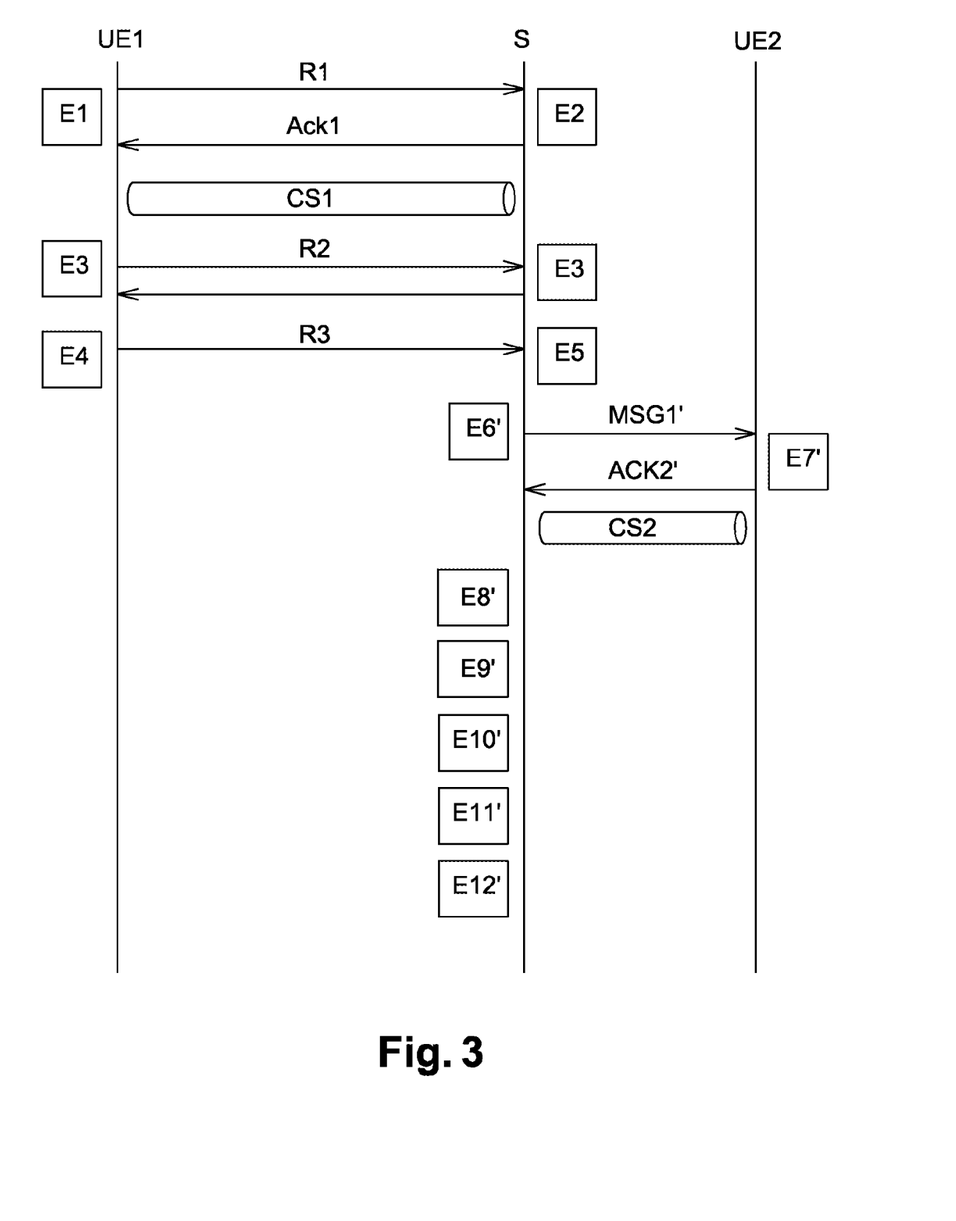
FIG. 3 represents a second embodiment of the method of the invention.

FIG. 3 represents a second embodiment of the method of the invention. In this embodiment, steps E1 to E3 are the same in the previous embodiment and will not be described again.

During a step E4, which may be or may be not concomitant with step E3, the user equipment UE1 sends a request R3 for sharing at least one electronic content to the server S. The request R3 comprises the identifier Id3 of the second user equipment UE2 and other information such as an authorization to play synchronously the selected electronic content on both user equipments UE1 and UE2, the possibility for the second user equipment UE2 to refuse the synchronization of the playing of the selected electronic content, etc.

In a step E5, the server S generate the sharing parameter SP based on the identifier Id1 of the first user equipment UE1 and the identifier Id2 of the electronic content to be shared and the identifier Id3 of the second user equipment UE2.

In a step E6', the server S sends a message MSG1' to the second user equipment UE2 comprising the sharing parameter SP.

The transmission of the message MSG1' to the second user equipment UE2 may be triggered by the user of the second user equipment UE2 activating a link, such as an URL, displayed on the timeline of the account of the user of the first user equipment UE1 on a social network. In this embodiment, the server S may send the sharing parameter SP to the first user equipment UE1 as part of an URL that is intended to be displayed on the timeline of the account of the user of the first user equipment UE1 on a social network.

In a step E7', the second user equipment UE2 sends a message of acknowledgement Ack2' to the server S. Upon reception of the message of acknowledgment Ack2' by the server S, the communication session CS2 is established.

In a step E8', the server S verifies if the sharing parameter SP is still valid. When the validity of the sharing parameter depends on the number of times the selected electronic content referred to in the sharing parameter SP can be accessed, the server S checks how many time the selected electronic content effectively was accessed.

In a step E9', the server S then checks whether the selected electronic content is currently played on the first user equipment UE1. In the embodiment where the sharing parameter SP is issued for a certain length of time, for example, as long as the shared electronic content is being played on the first user equipment UE1, steps E8' and E9' are one and the same.

In a step E10', if the sharing parameter SP is valid and the selected electronic content is currently played on the first user equipment UE1, the server S transmits the selected electronic content to the second user equipment UE2 and triggers, in a step E11', the playing of the selected electronic content on the second user equipment UE2. Thus, the selected electronic content is played at the same time on the first user equipment UE1 and on the second user equipment UE2.

In another embodiment of the method according to the invention, the server S triggers, during the step E11', the playing of the selected electronic content on the second user equipment UE2 in order for the selected electronic content to be played synchronously on the first user equipment UE1 and on the second user equipment UE2.

During step E11', the server S determines if a duration of the transmitted electronic content already played on the first user equipment UE1 exceeds a threshold T. The threshold T may be for example 80%, i.e. the server S determines if 80% of the selected electronic content is already played on the first user equipment UE1. If it is the case, then the server S triggers the playing of the selected electronic content on the second user equipment UE2 from the beginning of said transmitted electronic content.

In the embodiment where the sharing parameter SP is issued for a certain length of time, for example, as long as the shared electronic content is being played on the first user equipment UE1, if the server S determines during step E9' that the selected electronic content is no longer played on the first user equipment UE1, the server S nevertheless transmits the select electronic content to the second user equipment UE2 during a step E12'.

Figure 4:
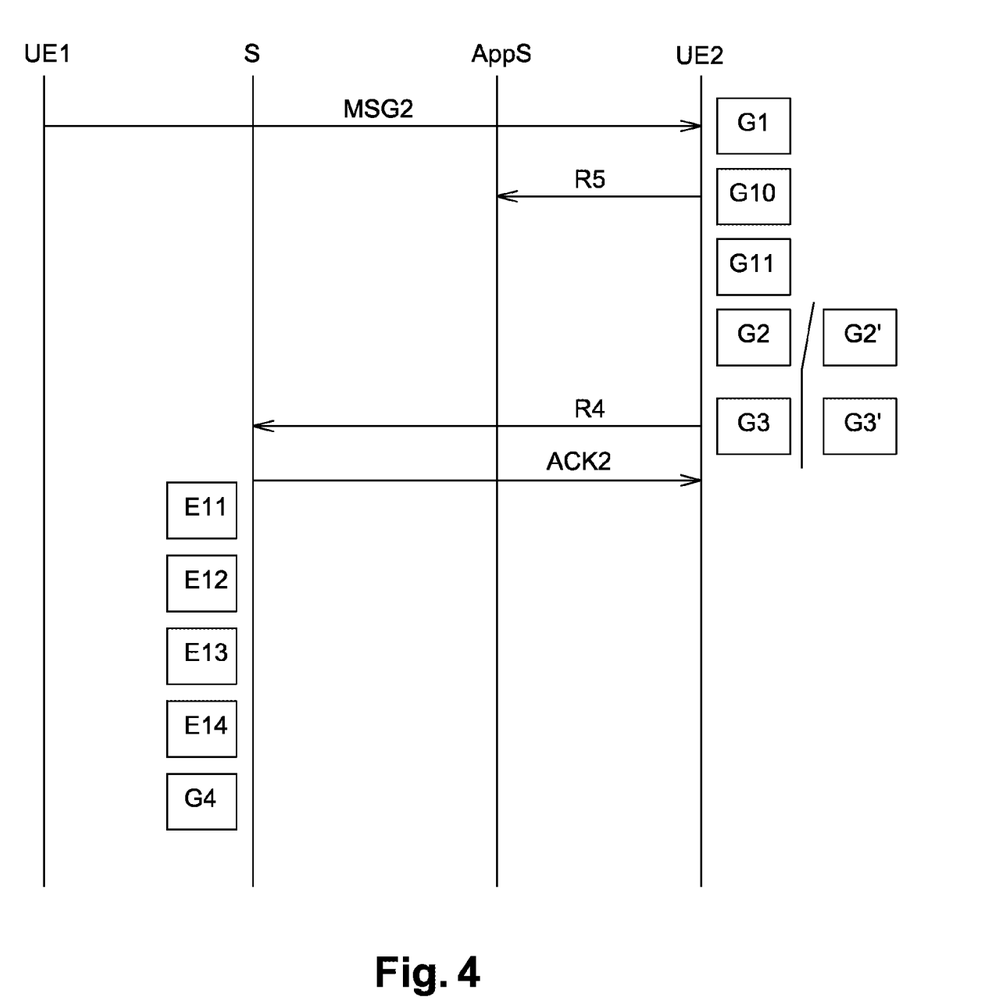
FIG. 4 is a flowchart detailing the steps of the method according to the first embodiment of the invention that are executed on the second user equipment side.

FIG. 4 is a flowchart detailing the steps of the method according to the first embodiment of the invention that are executed on the second user equipment side.

In a step G1, the second user equipment UE2 receives the message MSG2 sent by the first user equipment UE1 and comprising the sharing parameter SP and a piece of information enabling the second user equipment UE2 to communicate with the server S.

In an embodiment of the invention, upon reception of the message MSG2, the second user equipment UE2 opens a web browser and displays a dedicated web page during a step G2. The user of the second user equipment UE2 may access the selected electronic content via this web page. This web page contains an URL comprising the sharing parameter SP.

The activation of the URL in a step G3, triggers the transmission of the request R4 to the server S for establishing a second communication session CS2 between the second user equipment UE2 and the server S. The request R4 comprises the sharing parameter SP. The second user equipment UE2 then receives the message of acknowledgment Ack2 establishing the communication session CS2 with the server S.

Then, steps E11 to E14 are executed.

In a step G4, if the servers S determines that the sharing parameter is no longer valid, the URL comprising the sharing parameter SP is bookmarked. Thus the user of the second user equipment UE2 may access the selected content.

The bookmarking of the URL is either automatic or triggered by an action of the user of the second user equipment UE2. In the case of the automatic bookmarking, the detection of specific events triggers the bookmarking. These events may be the second user equipment UE2 entering an idle mode, the launching or running of another application on the second user equipment UE2, etc.

In another embodiment of the invention, upon reception of the message MSG2, the second user equipment UE2 opens a dedicated application during a step G2'. The user of the second user equipment UE2 may access the selected electronic content directly via this application. The sharing parameter SP and the piece of information enabling the second user equipment UE2 to communicate with the server S are stored in a memory of the second user equipment dedicated to the dedicated application.

In a step G3', the application generates the request R4 which is then transmitted to the server S for establishing a second communication session CS2 between the second user equipment UE2 and the server S. The request R4 comprises the sharing parameter SP. The second user equipment UE2 then receives the message of acknowledgment Ack2 establishing the communication session CS2 with the server S.

Then, steps E11 to E14 are executed.

In the step G4, if the servers S determines that the sharing parameter is no longer valid, a link pointing toward the selected electronic content is stored in the memory of the second user equipment dedicated to the dedicated application. Thus the user of the second user equipment UE2 may access the selected content.

If the dedicated application is not installed on the second user equipment UE2, the reception of the message MSG2 triggers the installation of the dedicated application on the second user equipment UE2. A pop-up message is displayed on a display of the second user equipment UE2 asking to the user of the second user equipment UE2 if he accepts or not the installation of the application on the second user equipment UE2.

If the user of the second user equipment UE2 accepts the installation of the application, in a step G10 directly following the step G1, the second user equipment sends a request R5 for downloading the dedicated application to an application server AppS. The request R5 comprises the sharing parameter SP and an identifier Id3 of the second user equipment UE2.

In a step G11, the dedicated application is downloaded and installed on the second user equipment UE2.

Then steps G2' to G4 are executed.

If when the user equipment is idle mode when the message MSG2 is transmitted or if the user of the user equipment refuse the installation of the dedicated application on the second user equipment UE2, the sharing parameter SP and a piece of information enabling the second user equipment UE2 to communicate with the server S comprised in the message MSG2 are stored in the second user equipment UE2, for example as a bookmark in the web browser so that the user of the second user equipment may access the selected electronic content later. A link pointing toward the application server AppS may also be stored for a future use.

Figure 5:
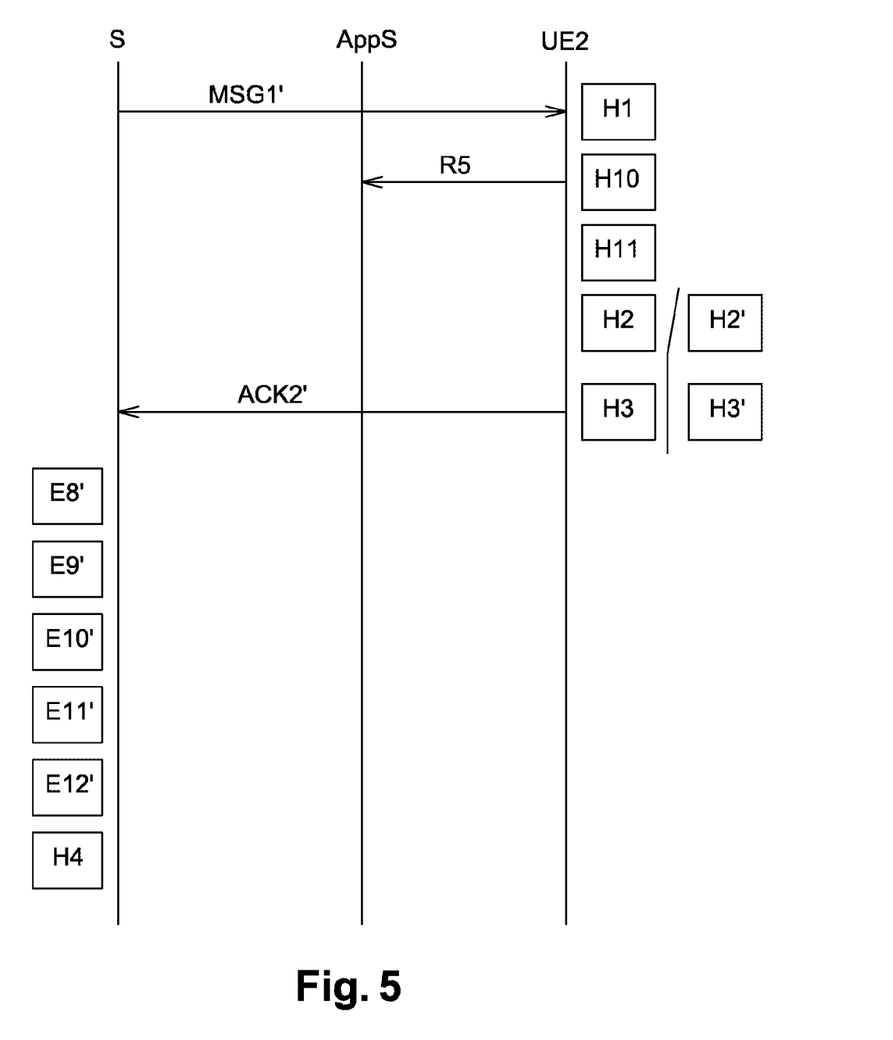
FIG. 5 is a flowchart detailing the steps of the method according to the second embodiment of the invention that are executed on the second user equipment side.

FIG. 5 is a flowchart detailing the steps of the method according to the second embodiment of the invention that are executed on the second user equipment side.

In a step H1, the second user equipment UE2 receives the message MSG1' sent by the server S and comprising the sharing parameter.

In an embodiment of the invention, upon reception of the message MSG1', the second user equipment UE2 opens a web browser and displays a dedicated web page during a step H2. The user of the second user equipment UE2 may access the selected electronic content via this web page. This web page contains an URL comprising the sharing parameter SP.

The activation of the URL in a step H3, triggers the transmission of the message of acknowledgement Ack2' to the server S for establishing a second communication session CS2 between the second user equipment UE2 and the server S.

Then, steps E8' to E12' are executed.

In a step H4, if the server S determines that the sharing parameter is no longer valid, the URL comprising the sharing parameter SP is bookmarked. Thus the user of the second user equipment UE2 may access the selected content.

The bookmarking of the URL is either automatic or triggered by an action of the user of the second user equipment UE2. In the case of the automatic bookmarking, the detection of specific events triggers the bookmarking. These events may be the second user equipment UE2 entering an idle mode, the launching or running of another application on the second user equipment UE2, etc.

In another embodiment of the invention, upon reception of the message MSG1', the second user equipment UE2 opens a dedicated application during a step H2'. The user of the second user equipment UE2 may access the selected electronic content directly via this application. The sharing parameter SP and the piece of information enabling the second user equipment UE2 to communicate with the server S are stored in a memory of the second user equipment dedicated to the dedicated application.

In a step H3', the application generates the message of acknowledgement Ack2' which is then transmitted to the server S for establishing a second communication session CS2 between the second user equipment UE2 and the server S establishing the communication session CS2 with the server S.

Then, steps E8' to E12' are executed.

In the step H4, if the server S determines that the sharing parameter is no longer valid, a link pointing toward the selected electronic content is stored in the memory of the second user equipment dedicated to the dedicated application. Thus the user of the second user equipment UE2 may access the selected content.

If the dedicated application is not installed on the second user equipment UE2, the reception of the message MSG2 triggers the installation of the dedicated application on the second user equipment UE2. A pop-up message is displayed on a display of the second user equipment UE2 asking to the user of the second user equipment UE2 if he accepts or not the installation of the application on the second user equipment UE2.

If the user of the second user equipment UE2 accepts the installation of the application, in a step H10 directly following the step H1, the second user equipment sends a request R5 for downloading the dedicated application to an application server AppS. The request R5 comprises the sharing parameter SP and an identifier Id3 of the second user equipment UE2.

In a step H11, the dedicated application is downloaded and installed on the second user equipment UE2.

Then steps H2' to H4 are executed.

If when the user equipment is idle mode when the message MSG2 is transmitted or if the user of the user equipment refuse the installation of the dedicated application on the second user equipment UE2, the sharing parameter SP and a piece of information enabling the second user equipment UE2 to communicate with the server S comprised in the message MSG2 are stored in the second user equipment UE2, for example as a bookmark in the web browser so that the user of the second user equipment may access the selected electronic content later. A link pointing toward the application server AppS may also be stored for a future use.

The invention claimed is:

1. A method for controlling sharing of at least one electronic content between a first user equipment and at least a second user equipment, wherein the method comprises:
    establishing, by a server storing electronic contents, a first communication session between the first user equipment and said server storing electronic contents enabling transmission of at least one electronic content from said server storing electronic contents to the first user equipment,
    receiving, by the server storing electronic contents, a request for sharing the transmitted electronic content emitted by the first user equipment,
    generating, by the server storing electronic contents, a sharing parameter from at least an identifier of the first user equipment and an identifier of the transmitted electronic content,
    determining, by the server storing electronic contents, based on the sharing parameter, that said electronic content transmitted to the first user equipment is to be shared with the second user equipment, and
    when the transmitted electronic content is currently played on the first user equipment, transmitting, by the server storing electronic contents, said transmitted electronic content to the second user equipment in order for said transmitted electronic content to be played simultaneously on the second user equipment.

2. The method of claim 1 wherein the method further comprises the following acts performed by the server:
    transmitting the sharing parameter to the first user equipment, and
    receiving a request, emitted by the second user equipment, for establishing a second communication session, said request for establishing the second communication session comprising the sharing parameter.

3. The method of claim 1 wherein the method further comprises the following acts performed by the server:
    generating the sharing parameter from the identifier of the first user equipment, the identifier of the transmitted electronic content and an identifier of the second user equipment transmitted by the first user equipment,
    sending, to the second user equipment, a request for establishing a second communication session, said request for establishing said second communication session comprising the sharing parameter, and
    receiving an acknowledgment message from the second user equipment completing the establishment of the second communication session.

4. The method of claim 1 wherein the server transmits the transmitted electronic content to the second user equipment in order for the transmitted electronic content to be played synchronously on the first user equipment and on the second user equipment.

5. The method of claim 1 wherein, when a duration of the transmitted electronic content already played on the first user equipment exceeds a threshold, the server transmits the transmitted electronic content to the second user equipment in order for the transmitted electronic content to be played on the second user equipment from the beginning of said transmitted electronic content.

6. The method according to claim 1 wherein, if the playing of the transmitted electronic content on the first user equipment is over, the server transmits said transmitted electronic content to the second user equipment in order for said transmitted electronic content to be played on the second user equipment.

7. A method for sharing at least one electronic content between a first user equipment and at least a second user equipment, wherein the method comprises the following acts performed by the first user equipment:
    establishing a first communication session between the first user equipment and a server storing electronic contents and enabling transmission of at least one electronic content to the first user equipment,
    transmitting, to the server, a request for sharing the transmitted electronic content,
    receiving, from the server, a sharing parameter generated by the server from an identifier of the first user equipment and an identifier of the transmitted electronic content, and
    transmitting, to the second user equipment, a message comprising the sharing parameter.

8. A method for accessing at least an electronic content stored on a server, wherein the method comprises the following acts performed by a second user equipment:
    receiving a sharing parameter generated by the server from at least an identifier of a first user equipment and an identifier of the electronic content to be accessed, a first communication session being established between said first user equipment and said server enabling the transmission of said electronic content to the first user equipment,
    establishing a second communication session with said server, using said sharing parameter, and
    receiving, from the server, said electronic content to be accessed in order for said transmitted electronic content to be played on the second user equipment.

9. A server capable of controlling sharing of at least one electronic content between a first user equipment and at least a second user equipment, wherein the server comprises:
    a receiver;
    a transmitter;
    a processor; and
    a non-transitory computer-readable medium comprising instructions stored thereon which when executed by the processor configure the server to:
    store the at least one electronic content;
    establish a first communication session between the first user equipment and said server enabling transmission of the at least one electronic content from said server to the first user equipment;
    receive by the receiver a request for sharing the at least one electronic content transmitted to the first user equipment, the request being emitted by the first user equipment;
    generate a sharing parameter from an identifier of the first user equipment and an identifier of the at least one electronic content transmitted to the first user equipment;
    determine, based on the sharing parameter, that said at lest one electronic content transmitted to the first user equipment is to be shared with the second user equipment;
    determine if the transmitted at least one electronic content is currently played on the first user equipment; and
    transmit by the transmitter, when the transmitted electronic content is currently played on the first user equipment, said transmitted at least one electronic content to the second user equipment in order for said transmitted at least one electronic content to be played simultaneously on the second user equipment.

10. A first user equipment capable of sharing at least one electronic content with at least another, second user equipment, wherein the first user equipment comprises:
    a receiver;
    a transmitter;
    a processor; and
    a non-transitory computer-readable medium comprising instructions stored thereon which when executed by the processor configure the first user equipment to:
    establish a first communication session between the first user equipment and a server storing electronic contents and enabling transmission of at least one electronic content to the first user equipment,
    transmit by the transmitter, to the server, a request for sharing the transmitted electronic content,
    receive by the receiver, from the server, a sharing parameter generated by the server from an identifier of the first user equipment and an identifier of the transmitted electronic content, and
    transmit by the transmitter, to the second user equipment, a message comprising the sharing parameter.

11. A second user equipment capable of accessing at least an electronic content stored on a server, wherein the second user equipment comprises:
    a receiver;
    a processor; and
    a non-transitory computer-readable medium comprising instructions stored thereon which when executed by the processor configure the second user equipment to:
    receive by the receiver a sharing parameter generated by the server from an identifier of another, first user equipment and an identifier of the electronic content to be accessed, a first communication session being established between said first user equipment and said server enabling transmission of said electronic content to said first user equipment;
    establish a second communication session with said server using the sharing parameter; and
    receive by the receiver, from the server, said electronic content to be accessed in order for said transmitted electronic content to be played on the second user equipment.

* * * * *